(12) United States Patent
Herles et al.

(10) Patent No.: US 7,008,113 B2
(45) Date of Patent: Mar. 7, 2006

(54) ROLLER BEARING IN A DEEP-DRILLING APPARATUS

(75) Inventors: Günter Herles, Dittelbrunn (DE); Dieter Göbel, Thundorf (DE); Richard Mützel, Thundorf (DE)

(73) Assignee: Fag Kugelfischer AG, (DE)

( * ) Notice: Subject to any disclaimer, the term of this patent is extended or adjusted under 35 U.S.C. 154(b) by 77 days.

(21) Appl. No.: 10/327,290

(22) Filed: Dec. 19, 2002

(65) Prior Publication Data
US 2003/0138173 A1    Jul. 24, 2003

(30) Foreign Application Priority Data
Dec. 19, 2001    (DE)    ................. 101 62 473

(51) Int. Cl.
*F16C 33/62*    (2006.01)
(52) U.S. Cl. .................... 384/192; 384/521; 384/907.1
(58) Field of Classification Search ................ 384/492, 384/907.1, 521
See application file for complete search history.

(56) References Cited

U.S. PATENT DOCUMENTS

| | | | | |
|---|---|---|---|---|
| 4,872,771 A | * | 10/1989 | Ueno et al. | .................. 384/492 |
| 5,904,426 A | * | 5/1999 | Tsuru et al. | ................. 384/462 |
| 6,149,311 A | * | 11/2000 | Gabelli et al. | .............. 384/491 |
| 2002/0136476 A1 | * | 9/2002 | Bouille | ....................... 384/492 |

FOREIGN PATENT DOCUMENTS

DE    2527237    1/1977

* cited by examiner

*Primary Examiner*—Thomas R. Hannon
(74) *Attorney, Agent, or Firm*—Ostrolenk, Faber, Gerb & Soffen, LLP

(57) ABSTRACT

A ball-bearing unit for a bearing of a deep-drilling apparatus having bearing races made from steel with balls disposed therebetween. Contaminated drilling medium passes into the space between the bearing races. Load-bearing balls made from ceramic alternate with separating balls of smaller diameter made from steel between the bearing races to extend significantly the service life of the ball-bearing unit.

12 Claims, 2 Drawing Sheets

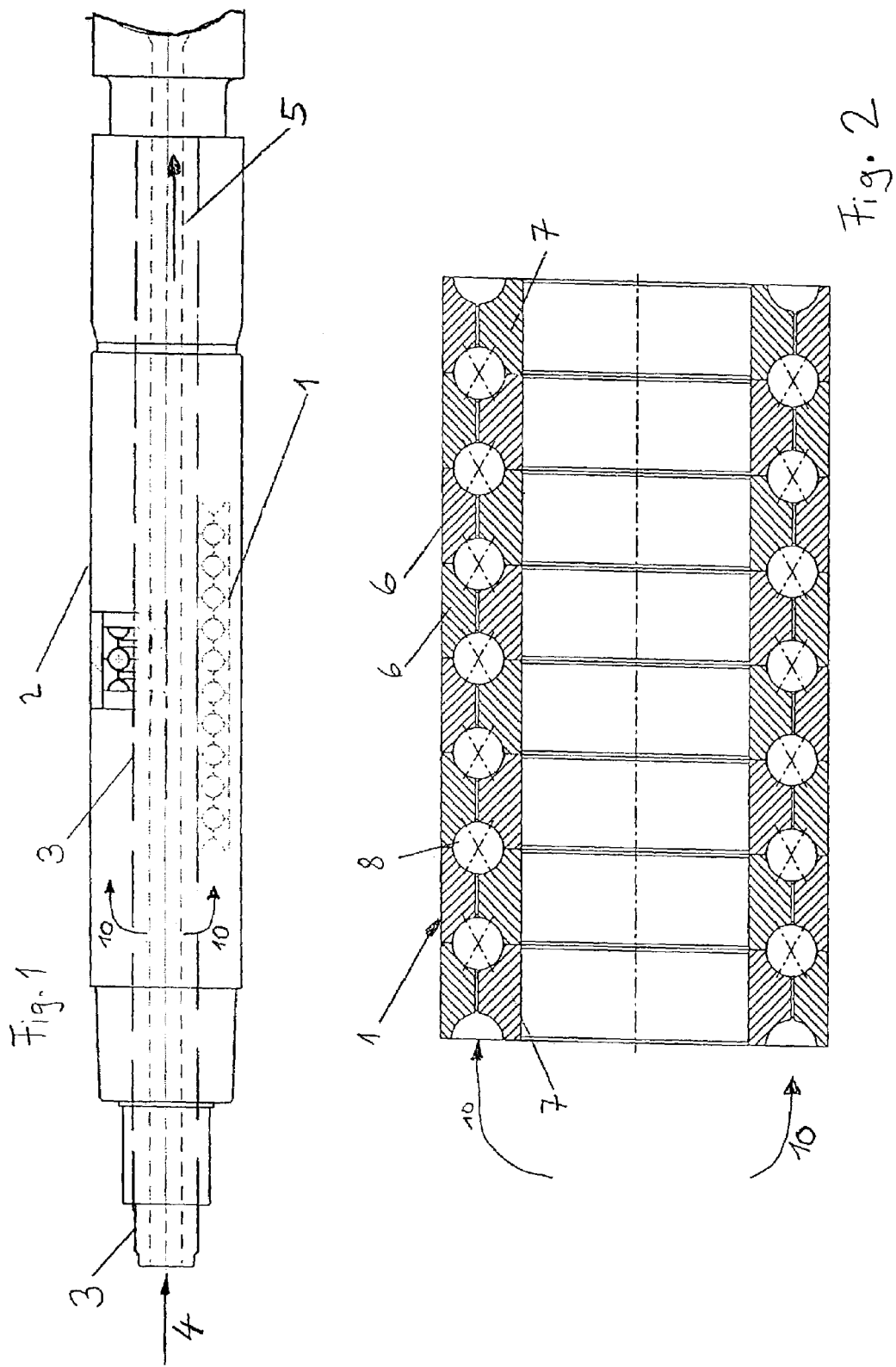

ROLLER BEARING IN A DEEP-DRILLING APPARATUS

FIELD OF THE INVENTION

The invention relates to the mounting of a hollow shaft between a drilling head and drive turbine in a deep-drilling apparatus.

BACKGROUND OF THE INVENTION

In deep-drilling rigs, drilling heads that are driven in the well have long been in use. Drilling liquid is pumped through a stationary pipe under pressure from outside toward the drilling head. A turbine at the end of the pipe converts the pressure of the drilling liquid into a rotary movement that drives the drilling head. After it has passed the turbine, the drilling liquid runs through a hollow shaft to the drilling head to lubricate and cool the drilling head. Drilling liquid, flows back to the surface outside the drilling head and carries drilled-out rock to the surface. Because of the rough ambient conditions, the drilling liquid, containing impurities, repeatedly penetrates into the roller bearings. One effect is rapid wear of the roller bearings.

The roller bearing used in the drilling head in DE 25 27 237 C3 is protected by special seals in order to prevent the penetration of water. Despite filtration, the liquid or water still contains a great many impurities. The problem with these seals is that the water can penetrate into the roller bearing despite the seals. Then the impurities in the water damage the roller bearing, so that the service life of the roller bearing is greatly reduced.

Roller bearings are known which include completely spherical four-point bearings. All roller bearing components of these four-point bearings are made from a wear-resistant roller bearing steel (AISI S2). But an even longer service life of the roller bearing would be desirable, because changing the roller bearing is very expensive for the operator of the deep-drilling apparatus.

OBJECT OF THE INVENTION

It is therefore an object of the present invention to provide a roller bearing for a deep-drilling apparatuses which has a longer service life under operating conditions in which drilling water runs through the bearing.

Other objects and features of the present invention will become apparent from the following description of the invention which refers to the accompanying drawings.

DESCRIPTION OF THE INVENTION

In the invention which concern a ball bearing load-bearing balls are made from ceramic and are spaced a distance apart from each other by slightly smaller separating balls made from steel or an appropriate other metal or material which serves the separating function described herein. The bearing tracks of the bearing races are likewise made from steel or such other material. As a result, the load-bearing roller bodies made only from ceramic make rolling contact with steel surfaces or the other material surfaces.

In the case there are impurities, e.g., from drilling, in the roller bearing, and in the case of defective lubrication, direct material contact takes place during rolling. In the invention, this direct material contact is always between ceramic and the steel or the other material. It has been found, surprisingly, that in the event of defective lubrication, the wear between bodies in rolling contact (steel and ceramic) is less than in the case of prior art rolling pairings (steel against steel).

The effect of the rolling pairing of steel and ceramic on the service life of the roller bearing (for example, an axial bearing) is surprising in that, arithmetically, the service life of the roller bearing according to the invention is shorter than that of a completely spherical axial bearing according to the prior art, with steel balls of equal size. But, experiments have shown that the technical disadvantage of the bearing arrangement according to the invention is compensated for by the reduced wear of the bodies in rolling contact. In experiments conducted in realistic ambient conditions, the roller bearings according to the invention last considerably longer than the conventional bearings.

Before the experiments, it was the predominant opinion that ceramic balls were not particularly durable in a contaminated environment including, inter alia, hard particles of sand. The experiments have shown that the roller bearings made from ceramic withstand this environmental condition without significant damage.

BRIEF DESCRIPTION OF THE DRAWINGS

FIG. 1 shows a drilling head with a bearing.

FIG. 2 shows the bearing packet in section parallel to the axis of rotation.

DESCRIPTION OF PREFERRED EMBODIMENTS OF THE INVENTION

Figure 3:
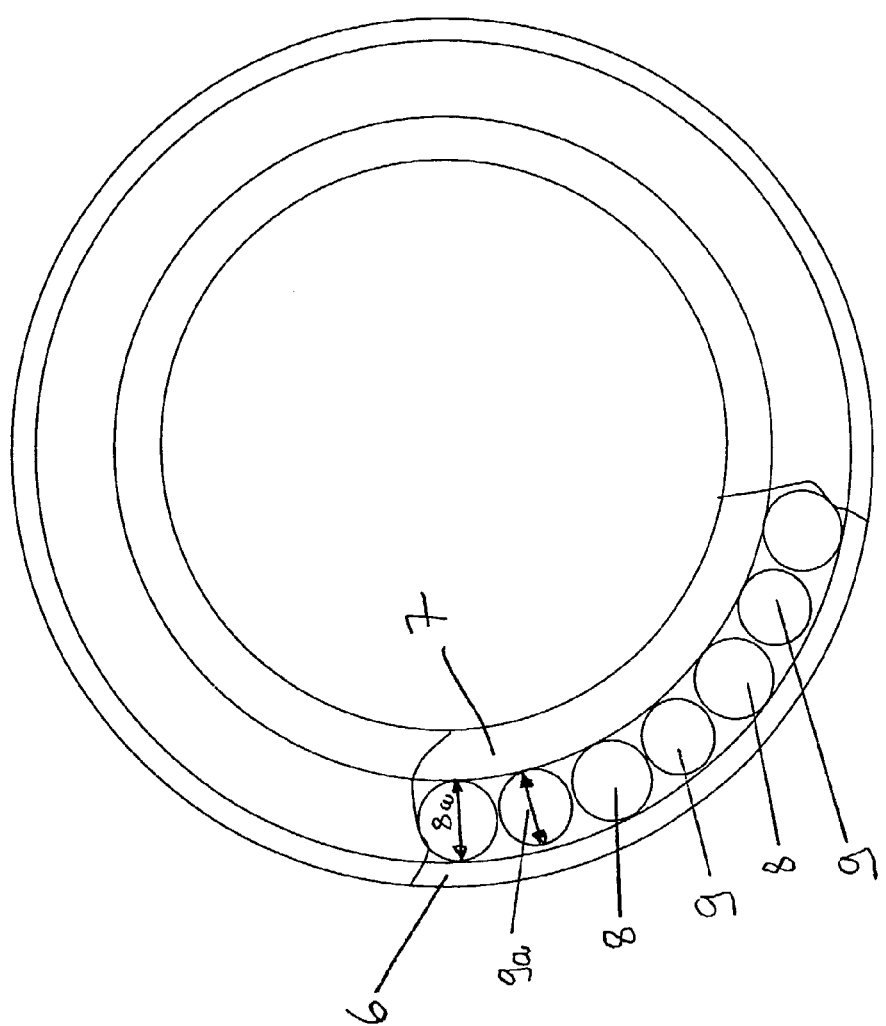
FIG. 3 shows a plan view of a detail of a bearing.

FIG. 1 shows a roller bearing of a drive shaft of a drilling head. It is shown in the form of a ball bearing unit 1. The drive shaft is a hollow shaft 3 and is disposed within the roller bearing. The hollow shaft 3 is rotatably supported by the roller bearing (bearing unit) 1 in a non-rotating housing 2. The hollow shaft 3 transmits drive torque from a drive turbine (not shown) to a drilling head (not shown). The fluid which operates the drive turbine is passed in direction 4 in the hollow shaft 3. Upstream of the roller bearing, some fluid is passed through apertures 10 in the ball-bearing unit 1, to provide liquid to cool and lubricate the roller bearing. The drilling head is then cooled and lubricated by the fluid which emerges at 5 from the hollow shaft. As the fluid is always somewhat contaminated, impurities constantly enter the ball-bearing unit 1.

FIG. 2 shows the ball-bearing unit 1 which mounts the hollow shaft relative to the housing. In this example, a plurality of completely spherical radial/axial ball bearings (4-point bearings) are arranged parallel to one another in a bearing unit 1. A 4-point bearing includes two outer bearing races 6 and two inner bearing races 7 at each annular row of bearing balls 8.

Between the inner and outer bearing races, a load-bearing ceramic ball 8 is followed by a somewhat smaller separating ball 9 in an annular array of alternating types of balls. In FIG. 3, the arrangement of the balls 8, 9 is shown in plan view. In each individual bearing of this ball-bearing unit 1, load-bearing ceramic balls 8 alternating with separating steel balls 9 are used.

The bearing races 6, 7, are made from a first material steel, and the separating steel balls 9 may be made from a material number to the first material such as roller bearing steel, stainless roller bearing steels or from wear-resistant steels. A preferred embodiment for the race and the separating balls here is AISI S2 steel.

FIG. 3 shows a plan view of a series of balls of the ball-bearing unit 1. The load-bearing ceramic balls 8 and the slightly smaller steel balls 9 are shown. The ceramic balls 8 have a diameter 8a are in rolling contact only with steel parts i.e., adjacent steel balls 9 or the bearing races 6, 7. The steel balls 9 of smaller diameter 9a are smaller sufficiently to ensure that, in maximum loading of the roller bearing, these separating steel balls 9 do not become load-bearing balls.

The ceramic balls 8 may consist of solid ceramic or may be comprised of a base material that is coated with ceramic. This ceramic material may consist, for example, of silicon nitride or zirconium oxide.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ball-bearing assembly which rotatably supports a hollow shaft in a stationary housing of a deep-drilling apparatus comprising a bearing unit having:
   radially separated inner and outer bearing races made of a first material suitable for forming a bearing raceway,
   the inner race being constructed and configured to be mounted in fixed relationship on the outside of the hollow shaft, and the outer race being constructed and configured to be mounted in fixed relationship on the inside of the stationary housing;
   a plurality of solid ceramic or ceramic coated load-bearing balls disposed in a raceway formed between the inner and outer races;
   a plurality of separating balls formed of a second material and disposed in the raceway in alternating relationship with the load-bearing balls, the separating balls being of a smaller diameter than the load-bearing balls; and
   the inner and outer races being so constructed and configured to provide communication between the hollow shaft and the bearing unit which permits drilling fluid flowing down the hollow shaft to enter the bearing unit to serve as a coolant and a lubricant.

2. A ball-bearing unit as in claim 1, wherein there is direct rolling contact between the bearing balls and the first material surfaces of the raceway, and between the bearing balls and the second material surfaces of the separating balls, in case of defective lubrication or entry of contaminated drilling fluid into the bearing unit.

3. The ball bearing unit of claim 1, wherein the bearing races and separating balls are formed of steel and the bearing balls are formed of a base material having a ceramic coating.

4. The ball bearing unit of claim 3, wherein the steel of the bearing races is the material AISI S2 (1.2890 B).

5. A ball bearing unit as in claim 1, wherein the first and second materials are the same.

6. An assembly including a hollow shaft, a housing around the shaft and the ball bearing unit according to claim 1, disposed between the shaft and the housing.

7. The assembly of claim 6, comprising a plurality of the bearing units arrayed along the shaft and disposed between the shaft and the housing, the raceways being in communication to permit passage of drilling fluid from one bearing unit to the next for lubrication.

8. An assembly of axially extending four point ball-bearing units rotatably supporting a hollow shaft in a stationary housing of a deep-drilling apparatus, each of the bearing units comprising:
   radially separated first inner and outer bearing races made of a first material suitable for forming a bearing race;
   radially separated second inner and outer bearing races made of the first material and positioned axially adjacent to the first inner and outer bearing races;
   a plurality of solid ceramic or ceramic coated load-bearing balls disposed in a raceway formed between the first and second inner and outer races;
   a plurality of separating balls formed of a second material and disposed in the raceway in alternating relationship with the load-bearing balls, the separating balls being of a smaller diameter than the load-bearing balls; and
   a passage which provides communication between the hollow shaft and the bearing assembly which permits drilling fluid flowing down the hollow shaft to enter the bearing assembly to serve as a coolant and a lubricant.

9. A ball-bearing assembly as in claim 8, wherein there is direct rolling contact between the bearing balls and the first material surfaces of the raceway, and/or between the bearing balls and the second material surfaces of the separating balls, in case of defective lubrication or entry of contaminated drilling fluid into the bearing.

10. A ball bearing assembly as in claim 8, wherein the first material is steel.

11. A ball bearing assembly as in claim 10, wherein the first and second materials are the same.

12. A ball bearing assembly as in claim 8, wherein the first and second materials conform to AISI S2 (1.2890 B).

* * * * *